United States Patent Office 3,427,267
Patented Feb. 11, 1969

3,427,267
POLYESTER RESINS FROM HIGH MOLECULAR WEIGHT POLYESTERS AND PROCESS FOR PREPARING THEM
Gerhard Stieger, Wiesbaden, and Josef Flasch, Mainz-Bischofsheim, Germany, assignors to Chemische Werke Albert, Wiesbaden-Biebrich, Germany, a corporation of Germany
No Drawing. Continuation-in-part of applications Ser. No. 230,260, Oct. 12, 1962, and Ser. No. 342,791, Feb. 5, 1964. This application May 23, 1967, Ser. No. 640,484
Claims priority, application Germany, Oct. 12, 1961, C 25,265; Aug. 27, 1962, C 27,791, C 27,792; Feb. 9, 1963, C 29,117
U.S. Cl. 260—22    18 Claims
Int. Cl. C08g 17/10

ABSTRACT OF THE DISCLOSURE

Improvement in or relating to polyester resins. More particularly the invention is concerned with the preparation of polyester resins from high molecular weight polyesters of iso- and /or terephthalic acid.

---

The present application is a continuation-in-part-application of application 230,260, filed Oct. 12, 1962, and 342,791, filed Feb. 5, 1964, both abandoned.

In the preparation of foils, fibres or other plastic materials from the difficulty soluble high molecular weight esters of iso-and/or terephthalic acid and dihydric alcohols, particularly esters of ethyleneglycol, and also of propyleneglycol or butanediol, there are often obtained large amounts of waste products, e.g. in the form of chips or granules which waste products have hitherto been considered unusable. It is well known that high molecular weight esters of iso- and/or terephthalic acid and dihydric alcohols, which are obtained as waste products in the preparation of foils or fibres, have a fairly high molecular weight. Thus it is known from "Textil-Rundschau" issue of March 1958, page 130 left-hand column, paragraph II, 1 that such esters have average molecular weights of at least 8000. It is also known from "Makromolekulare Chemie" vol. 26 (1958) page 226 et seq. that such esters have a molecular weight up to about 25,000. Where the molecular weight is too low, no foils or fibres may be prepared from a polyethylene terephthalate or isophthalate. Accordingly the expression "high molecular weight esters," where used in this application in relation to esters of iso-or terephthalic acid and dihydric alcohols, always relates to esters of a molecular weight of at least 8000, e.g., up to 30000, and this is also applicable to the starting materials used in the examples.

We have now found that such high-molecular weight esters of dihydric alcohols and isophthalic and/or terephthalic acid can be used, with advantage, for the manufacture of more soluble saturated or unsaturated polyester resins having a lower molecular weight than the original esters.

According to the invention there is provided a process for the production of polyester resins which comprises reacting at elevated temperature and in one or more stages a high molecular weight polyester of isophthalic and/or terephthalic acid and a dihydric alcohol or a mixture of such esters with (a) at least one saturated or unsaturated, preferably α,β-olefinically unsaturated, dicarboxylic acid (other than iso- and terephthalic acid) or anhydride thereof, where such exists, or monoester, diester or oligomeric ester of such an acid and (b) at least one polyhydric alcohol, preferably a dihydric alcohol, advantageously one boiling above 200° C.

The process according to the invention is conveniently effected in a first stage, by dissolving the isophthalic and/or terephthalic acid ester in the hot in one reactant and then adding in a second stage a substantially equivalent amount of the other reactant except where the reactant of the first stage already contains almost equivalent amounts of hydroxy and carboxylic groups.

The isophthalic and/or terephthalic acid ester may be reacted with the dicarboxylic acid or polyhydric alcohol in any desired order and it is possible to react these esters with different acids or alcohols in a number of stages.

The process according to the invention is preferably carried out at temperatures greater than 180° C. and below the decomposition temperature of any of the reactants, advantageously at temperatures from 200 to 270° C. At these temperatures the high molecular weight ester dissolves rapidly in the dicarboxylic acids or anhydrides but more slowly in the polyhydric alcohols and in the esters of the dicarboxylic acids.

The properties of the polyester resins obtained are dependent on the ratio of the isophthalic and/or terephthalic acid ester to the other reactants, and are also dependent on the dicarboxylic acid and the polyhydric alcohol used and also on the degree of esterification. Generally the reaction is carried out until the resin has an acid value of not more than 70, preferably until the resin has an acid value between 20 and 60. However, the resin may also have a still lower acid value, e.g. as low as 5. The dicarboxylic acid other than isophthalic and terephthalic acid or one of the abovementioned derivatives thereof is generally used in an amount of at least 2, preferably between about 3 and 10 mols for every 3 molecular units of terephthalic and isophthalic acid ester.

The reaction may be carried out under pressure greater than atmospheric in suitable apparatus, e.g. in an autoclave. If the reaction products are to be used in admixture with solvents, the reaction may also be carried out in the presence of suitable solvents or diluents, for example high boiling aliphatic or aromatic or terpene hydrocarbons. In the case of terpenes reaction between the solvent and product may occur if unsaturated dicarboxylic acids or functional derivatives thereof are used in the preparation of the polyester. Solvents or diluents may, however, also be used when the resins are not intended to be used in admixture with solvents.

The resins may also be modified by adding a minor amount of resinic acids or long-chain fatty acids having, for example, from 12 to 22 carbon atoms. These acids may be used in any amount of up to 50 equivalent percent, calculated on the dicarboxylic acid (other than iso- and terephthalic acid) or derivative thereof and in general in an amount of 1 to 22 equivalent percent, again calculated on the dicarboxylic acid. These acids may be used in the first stage of the reaction, e.g. together with the dicarboxylic acids or derivatives thereof, but are preferably added during the second stage of the reaction.

Preferred dicarboxylic acids for use in the process according to the invention are α,β-olefinically unsaturated dicarboxylic acids, for example maleic acid, fumaric acid, itaconic acid, citraconic acid or mesaconic acid. Other suitable dicarboxylic acids are 1,4-dihydronaphthalene-2,3 or -1,2-dicarboxylic acid or those containing no polymerisable aliphatic bond, for example, succinic and glutaric acid, adipic acid, pimelic acid, suberic acid, azelaic acid, sebacic acid, phthalic acid or the hexahydrogenation product of isophthalic, phthalic or terephthalic acid, endomethylenetetra- or hexahydrophthalic acid, the isomeric tri- or tetrachlorophthalic acids and hexachloroendomethylene tetrahydrophthalic acid. If halogen-containing acids are used, they may be used in such a quantity as to render the final resin incombustible. If the polyesters are to be copolymerized with monomers the carboxylic acids containing no polymerizable olefinic bond are suitable applied in an amount of up to 50 equivalent-percent percent only, calculated on the amount of the polymerizable dicarboxylic acids.

As stated above the anhydrides, where they exist, or the monoesters, diesters or oligomeric esters of the dicarboxylic acids may be used in place of the acids themselves. The esters may, for example have any one of the formulae:

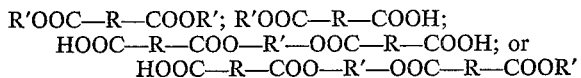

or an analogous structure. In these formulae R represents the radical connecting the two carboxylic groups, R' represents a radical derived from a polyhydric alcohol or a monohydric alcohol, said alcohols preferably having not more than 7 carbon atoms. The radical derived from monohydric alcohols may for example be methyl-, ethyl, propyl, isopropyl, alyl, primary-, secondary-, tertiary- or iso- butyl-, amyl, -hexyl, or -octyl or benzyl radicals or any one of the polyhydric alcohols, mentioned below, having all but one of their hydroxy groups being esterified. When R' represents a polyvalent radical, it may be a radical derived from the following alcohols which implies that these alcohols are suitable as reactant (b) ethylene glycol; diethylene glycol; triethyleneglycol; 1,2-propyleneglycol; 1,3-propanediol; a butanediol, pentanediol or hexanediol such as 1,3-butanediol or 1,4-butanediol; 2,2-dimethylpropane-1,3-diol; 2-ethyl-2-butylpropane-1,3-diol; 1,4-dimethylolcyclohexane; Δ-2,3-butenediol-1,4; a hydrogenated bisphenol (i.e. hydrogenated p,p'-dihydroxydiphenylpropane or homologues thereof); partially etherified or acetalized at least trihydric alcohols, which are preferably etherified or acetalized to such an extent that they still contain two free hydroxy groups, e.g. partially etherified or acetalized glycerol, trimethylolethane, trimethylolpropane, hexanetriol or pentaerythritol. The acetal or ether radicals may be saturated or olefinically unsaturated radicals in which the ethereal or acetal oxygen is bound to an aliphatic carbon atom and which contain up to 10, preferably 3 to 7, carbon atoms. Suitable radicals are e.g. the monovalent radicals described above for R' or the corresponding acetal groups. Other suitable polyhydric alcohols are dimethylolbenzene, dimethylol toluene and dimethylol xylene; addition products of alkylene oxides such as ethylene oxide, propylene oxide and butylene oxide with dihydric alcohols, e.g. those described above, or with dihydric phenols, such as resorcinol, hydroquinone, 4,4'-dihydroxydiphenylmethane, -ethane, -propane or homologues thereof. All the above-mentioned dihydric alcohols may be used as polyhydric alcohol in the process of the invention. It is preferred to employ the dihydric alcohols.

If desired, at least trihydric alcohols may be used in addition to the dihydric alcohols, examples of such alcohols being glycerol, trimethylolethane, trimethylolpropane and hexanetriol. The use of such alcohols modifies the properties of the reaction products to a considerable extent. Preferably, however, these alcohols are used to such an extent, that the portion of the "excess" hydroxy groups (i.e. the number of the free hydroxy groups per alcohol molecule greater than two) is not higher than 10 equivalent percent and preferably not higher than 7 equivalent percent of the hydroxy groups contained in the mixture. Such alcohols may also be used together with monohydric alcohols or monocarboxylic acids in amounts about equivalent to the excess hydroxy groups.

In addition to the dicarboxylic acids mentioned above, there may also be used other bifunctional acids such as monohydroxy monocarboxylic acids, in which the hydroxy groups may be esterified at the temperatures employed, e.g. in a molar ratio between 5:1 and 1:2. Suitable acids are for example ricinoleic acid and hydroxystearic acid. The acids may also be used together with higher polycarboxylic acids, such as pyromellitic acid. However, these polycarboxylic acids are preferably employed in an amount such that the "excess" carboxylic groups (i.e. the number of carboxylic groups per molecule of acid greater than two) are present in an amount not higher than 20 equivalent percent, preferably not higher than 10 equivalent percent of the carboxylic groups contained in the mixture. Such polybasic carboxylic acids may also be used together with monocarboxylic acids, preferably benzoic acid or fatty acids having at least 12 carbon atoms, or with monohydric alcohols, in amounts substantially equivalent to the "excess" carboxylic groups.

The polyester resins produced according to the invention are colourless and grindable, and may be used for a number of purposes. Per se, they are valuable basic products for resin compositions. They are also suitable for the manufacture of coatings on metals.

Those resins containing olefinical unsaturation (i.e. those derived from unsaturated dicarboxylic acids) may be copolymerized e.g. at a temperature in the range from 0 to 150° C., with ethylenically unsaturated polymerizable monomers to yield synthetic resins or polymerization products of good mechanical properties, such as a good flexural strength, and particularly may be used with success in the manufacture of glass fibre reinforced products. It is a characteristic of the polymerization products that they may be easily taken out of moulds.

According to a further feature of the invention, therefore, there is provided a process for the preparation of synthetic resins which comprises copolymerizing an unsaturated polyester resin produced by the process of the invention with an ethylenically unsaturated polymerizable monomer preferably in the presence of a polymerization catalyst.

Suitable ethylenically unsaturated polymerizable monomers include, for example, meta- and para-vinyl toluene, N-vinyl pyrrolidone, styrene, α-methylstyrene, α-chlorostyrene, vinyl acetate, vinyl propionate, allylacetate, allylpropionate, diallyl maleate, diallyl fumarate, diallyl succinate, diallyl adipate, diallyl azelate, diallyl sebacate, diallyl phthalate, triallylphosphate, triallylcyanurate; methyl-, ethyl-, propyl-, (primary, secondary, tertiary or iso) butyl-, amyl-, hexyl-, octyl- or allylacrylate or methacrylate, diallylitaconate, vinyl- or allyl borate, acrylonitrile or a mixture of such monomers or a mixture of such a monomer with up to 10 mol-percent, calculated on the monomer of divinylbenzene. Preferred monomers are those compounds in which the group —CH=CH$_2$ is bound to a negative radical such as a benzene nucleus or an ester group. Other preferred monomers are those, which contain no conjugated double bonds and are liquid under ordinary conditions. The amount of olefinically unsaturated monomer may vary between wide limits depending on the desired application. Thus it may be between 30 and 50% of the weight of the polyester resin, but it may be used in a far larger, e.g. 80%, or smaller amounts, e.g. 10%.

Suitable catalysts are organic peroxide catalysts, e.g. benzoylperoxide, 2,4-dichlorobenzoylperoxide, acetylperoxide, tert,-butylperoxide or -hydroperoxide, succinyl peroxide, lauroyl peroxide, cyclohexyl hydroperoxide, cyclohexanone peroxide, methyl-ethylketone peroxide, methylisobutylketone peroxide, dibenzaldiperoxide, cumene hydroperoxide, 2,2-bis-(tert.-butylperoxy)butane, tert.-butylperacetate, tert.-butylper-benzoate, ditert.-butyl-dipersuccinate, -diperphthalate, -diperterephthalate or azoisobutyronitrile. If desired, the polymerization may be promoted by accelerators such as tertiary amines, diethanolamine, triethylamine, tributylamine, e.g. dimethyl aniline, dimethyl-p-toluidine etc. or heavy metal salts of organic acids such as cobalt naphthenate or cobalt octoate.

In all cases a mixture of various compounds may be used instead of a single compound.

In order that the invention may be well understood the following examples are given by way of illustration only:

Example 1

300 grams of high molecular weight ethylene glycol terephthalate, obtained as a waste product in the form of chips in the manufacture of foil, were heated under an atmosphere of nitrogen with 294 grams of maleic anhydride at a temperature above 200° C. for a period of about one hour until a clear, homogeneous, solution of low viscosity was formed. After three hours 228 grams of 1,2-propanediol were slowly added while gradually raising the temperature by 20° C. and the reaction mixture was esterified at 220° C. until the acid value was below 50; the reaction product was then maintained for one hour at a reduced pressure of 20 to 30 mm. of mercury. On cooling a clear polyester resin of good grindability was obtained.

25 grams of this polyester resin were dissolved in 65 grams of ethyleneglycol monoethylether and 10 grams of ethyleneglycol monoethylether monoacetate and the resultant solution coated onto a sheet metal which was then heated for 10 minutes at 220° C. to yield a film coating having good adhesion and good resistance to chemicals.

70 grams of the polyester resin were dissolved in 30 grams of styrene and the solution hardened by the addition of 2 grams of benzoylperoxide paste (50% in dibutylphthalate) and heating at 80° C. to yield shaped bodies with good mechanical properties. 50 grams of the above solution of polyester resin in styrene were admixed with 1.5 grams of benzoyl peroxide paste and 0.5 to 1 gram of a conventional tertiary amine accelerator. 35 grams of a glass fibre mat were then impregnated with this solution. A glass fibre reinforced body having very good flexural strength and high tensile strength was produced.

Example 2

175 grams of high molecular weight ethylene glycol terephthalate were dissolved as described in Example 1 in 196 grams of maleic anhydride and 148 grams of phthalic anhydride, while heating at a temperature above 200° C. 228 grams of 1,2-propanediol were then added within 3 hours while slowly raising the temperature to 220° C. and the mixture was esterified until the acid value was below 50. The mixture was then maintained, with stirring, for one hour under reduced pressure of 20 to 30 mm. of mercury. The solution solidified on cooling to yield a limpid polyester resin of good grinding property, which could be used as described in Example 1.

Example 3

300 grams of high molecular weight ethylene glycol terephthalate were heated with 684 grams of dibutyl maleate at a temperature above 220° C. with stirring under an atmosphere of protective gas until a limpid homogeneous solution of low viscosity was formed. 312 grams of 2,2-dimethylpropane-1,3-diol were then added in portions with stirring and the mixture was esterified while raising the temperature by 30° C., until a 50% solution in ethyleneglycol monoethylether had a viscosity of 120 cp. The mixture was then maintained for one hour at a reduced pressure of 20 to 30 mm. of mercury to yield a clear polyester resin of good grindability.

Example 4

200 grams of high molecular weight polyethylene glycol terephthalate were heated with 312 grams of 2,2-dimethyl-propane-1,3-diol to a temperature above 200° C. under an atmosphere of a protective gas until a clear homogeneous solution of low viscosity was formed. 116 grams of fumaric acid and 296 grams of phthalic anhydride were then added in portions. The mixture was esterified while slowly raising the temperature until the acid value was below 50. The mixture was then maintained for one hour at a reduced pressure of 20 to 30 mm. of mercury. Upon cooling a clear polyester resin of good grinding property was obtained.

Example 5

300 grams of high molecular weight terephthalic ester, 312 grams of 2,2-dimethyl-propane-1,3-diol, 74 grams of phthalic anhydride and 247 grams of maleic anhydride were reacted as described in Example 4 to yield a clear solid polyester resin.

Example 6

300 grams of high molecular weight terephthalic ester, 270 grams of 1,3-butanediol, 74 grams of phthalic anhydride and 247 grams of maleic anhydride were reacted as described in Example 4 to yield a clear polyester resin of good grindability.

Example 7

300 grams of high molecular weight ethylene glycol terephthalate chips were heated, with stirring under an atmosphere of protective gas, with 312 grams of 2,2-dimethylpropane-1,3-diol at a temperature above 200° C., until a clear homogeneous solution of low viscosity was formed. 742 grams of 3,6-endodichloromethylene-tetrachloro-tetrahydrophthalic anhydride were then added and the mixture was esterified until the acid value was below 50. Thereafter 98 grams of maleic anhydride were added and the mixture again esterified until the acid value was below 50 and the mixture then maintained for one hour at a reduced pressure of 20 to 30 mm. of mercury to yield a clear resin of good grinding property. The resin was dissolved in styrene in a weight ratio of 70 to 30 and was copolymerized at 80° C. after addition of 2% of a 50% benzoylperoxide paste to produce shaped bodies having good heat resistance.

Example 8

300 grams of chips of high molecular weight ethylene glycol terephthalate were heated, with stirring under an atmosphere of protective gas, with 312 grams of 2,2-dimethylpropane-1,3-diol to a temperature above 200° C., until a clear homogeneous solution of low viscosity was formed. 858 grams of tetrachlorophthalic acid were then added and the mixture was esterified until the acid value was below 50. The mixture was then maintained, with stirring, at a reduced pressure of 20 to 30 mm. of mercury. A transparent resin of good grinding property was obtained. The resin was suitable for the preparation of fire-retarding resin compositions.

Example 9

292 grams of adipic acid and 300 grams of high molecular weight ethylene glycol terephthalate were heated, with stirring under an atmosphere of protective gas, to a temperature above 220° C. 312 grams of 2,2-dimethyl-propane-1,3-diol were then added in portions. The mixture was esterified until the acid value was below 10 and was further esterified with 98 grams of maleic anhydride until the acid value was below 50. The mixture was then maintained at a reduced pressure of 20 to 30 mm. of mercury for one hour.

70 grams of the resultant resin were dissolved in 30 grams of styrene and the solution copolymerized by the addition of 2% of a benzoyl peroxide paste (50% in dimethylphthalate) at 80° C. to produce shaped bodies having good impact and flexural strength.

Example 10

98 grams of maleic anhydride were slowly heated with 85 grams of 1,2-propanediol and 200 grams of high molecular weight ethylene glycol terephthalate, with stirring under an atmosphere of protective gas, to a temperature of 230° C., until the acid value was below 30 and a 50% solution in ethyleneglycol monoethylether at 20° C. had a viscosity of about 150 cp. The mixture was then maintained under reduced pressure for a short time to remove volatile material and was then stabilized by the addition of 0.04 gram of hydroquinone.

Example 11

98 grams of maleic anhydride were esterified at 160 to 180° C. with 111 grams of 1,2-propanediol under an atmosphere of protective gas and while stirring until the acid value was below 180. (i.e. excess propanediol was present). Then 200 grams of high molecular weight ethyleneglycol terephethalate chips were added and the mixture kept at 230° C. until the acid value fell to below 20. After the addition of 49 grams of maleic anhydride the mixture was further esterified until the acid value was about 35 and a 50% solution of the polyester in ethyleneglycol monoethylether had a viscosity of about 150 cp. at 20° C. The resin was then maintained under reduced pressure for a short time and finally stabilized by the addition of 0.04 grams of hydroquinone.

350 grams of the unsaturated polyester resin and the polyester resin produced in example 10 were dissolved in 150 grams of styrene.

These solutions could be hardened by heating after the addition of 1 to 3% of benzoylperoxide paste (50% in dimethylphthalate) or in the cold by adding 2 to 5% of cyclohexanone peroxide paste (50% in dibutylphthalate) and 0.5 to 2% of a 10% solution of cobalt naphthenate in sytrene.

From the solutions shaped bodies could be prepared which have been reinforced by glass fibres and which have good flexural strength, high heat distortion temperature and a high impact strength.

These resins could also be used as coatings on wood and metal which were substantially tack-free even when exposed to air.

Example 12

200 grams of high molecular weight ethyleneglycol terephthalate chips were trans-esterified by boiling with 130 grams of 2,2-dimethyl-propane-1,3-diol under an atmosphere of a protective gas and with stirring to yield an intermediate product.

A quantity of toluene and 172 grams of maleic anhydride were added to this intermediate and the mixture was further esterified whilst removing the water which was formed. When an acid number below 100 was reached, 108 grams of pentaerythritol diallylether were added to the mixture and the esterification was continued until the acid value was about 40 and a 50% solution in ethyleneglycol monethylether had a viscosity of about 150 cp. at 20° C. The unsaturated polyester resin thus produced was then maintained under reduced pressure for a short time to remove remaining toluene and volatile material and was stabilized by the addition of 0.06 gram of hydroquinone.

Example 13

The procedure of example 12 was repeated except that 87 grams of trimethylolpropane monoallylether were used instead of the pentaerythritol diallylether. A similar resin was obtained which was also stabilized by the addition of 0.06 gram of hydroquinone.

325 gram portions of the polyester resin and the polyester resin produced in example 12 were each dissolved in 175 grams of styrene and the mixtures copolymerized by the addition of 2 to 6% of cyclohexanone peroxide paste (50% in dibutylphthalate) and 1 to 3% of a 10% solution of cobalt-naphthenate in styrene. Coatings were obtained which had good adhesion to wood and to metal and which dried, even without the addition of wax, substantially tack-free when exposed to the air. These coatings could be rubbed and polished after 24 hours.

Example 14

150 grams of ricinoleic acid and 148 grams of maleic anhydride are added to the intermediate product described in Example 12 and the mixture was condensed whilst separating off the water formed until the final product had an acid number of about 40 and the viscosity of a 50% solution in ethyleneglycol monoethyl ether was 150 cp. at 20° C. The resin was then kept under reduced pressure for a short time to remove volatile material and was finally stabilized by the addition of 0.07 grams of hydroquinone.

Example 15

The procedure of Example 14 was repeated except that instead of the ricinoleic acid, 150 grams of hydroxy stearic acid were used. The unsaturated polyester resin produced was stabilized by the addition of 0.07 gram of hydroquinone.

350 grams of the unsaturated polyester resin and the unsaturated polyester resin produced in example 14 were each dissolved in 150 grams of styrene.

These solutions could be hardened in the hot by the addition of 1 to 3% of benzoyl peroxide paste (50% in dimethylphthalate) and in the cold by the addition of 1 to 4% of cyclohexanone peroxide paste (50% in dibutylphthalate) and 0.5 to 2% of a 10% solution of cobalt naphthenate in styrene.

Shaped bodies obtained from these hardened solutions including shaped bodies reinforced with glass fibre, had good flexural strength and a high impact strength.

Example 16

200 grams of high molecular weight ethylene glycol terephthalate and 104 grams of 2,2-dimethylpropane-1,3-diol were transesterified at the boiling point of the dimethylpropanediol until the reaction product was soluble in ethanol. Then 112 grams of phthalic anhydride and 225 grams of ricinoleic acid were added and the mixture was further condensed at 190° C. using toluene as an entrainer and separating the water formed, until the acid value was below 30 and a 50% solution of the resin in ethylene glycol monoethylether had a viscosity of 100 cp. at 20° C.

The product was maintained under a reduced pressure of 20 to 30 mm. of mercury of a short time to yield a light-brown, tough, solid resin which was soluble in all quantities of styrene. The resin could be used as a plasticizer for unsaturated polyester resins and other varnish materials.

Example 17

125 g. of 2,2-dimethylpropanediol-1,3 and 150 g. of ships of a high-molecular weight ester derived from isophthalic acid and ethylene glycol are heated with stirring under an atmosphere of protective gas to 220° C. until the reaction product is soluble in alcohol in a ratio of 1:9. The mixture is cooled to 140° C.; a mixture of 30 g. of o-phthalic anhydride, 93 g. of maleic anhydride, 0.03 g. of hydroquinone and 20 g. of toluene is added thereto and the product is esterified at a temperature of 220° C. The esterification is continued separating the water formed and recycling the toluene until the acid value is below 40. The volatile reaction products are removed at 20 to 30 mm. of mercury. A clear, grindable resin is obtained.

350 g. of this resin are mixed with 150 g. of styrene and 0.05 g. of hydroquinone. After the addition of 2% of a 50% benzoyl peroxide paste in dibutylphthalate the product is hardened by heating. Shaped bodies are obtained having a bending strength of 1200 to 1300 kp./cm.$^2$, an impact strength of 15 to 16 cm. kp./cm.$^2$ and a dimensional stability according to Martens method of 66 to 68° C. After storing for 72 hours in 10% caustic soda the bending strength is 300 to 700 kp./cm$^2$.

EXAMPLE 18

125 g. of 2,2-dimethylpropanediol-1,3 and a mixture of 100 g. of waste of foils of high-molecular weight esters of ethanediol and isophthalic acid and ethanediol and terephthalic acid under protective gas and stirring are heated to 200 to 230° C. until the melt is soluble in cold ethanol. After cooling to 180° C. 98 g. of maleic anhydride, 30 g. of o-phthalic anhydride, 0.03 g. of hydroquinone and 20 g. of toluene are added thereto and esterified in the circulation procedure at 200 to 225° C. until the acid value is below 40. The mixture is condensed for another hour at 20 to 30 mm. of mercury and 200 to 210° C. A yellowish-brown, clear, grindable resin is obtained having an acid value of 19. A 65% solution of this resin in styrene is admixed with 2 to 4% of a benzoylperoxide paste (50% in a dibutylphthalate) and hardened in the heat. Shaped bodies resistant against chemicals are obtained which are distinguished by a good heat distortion according to Martens and a high impact resistance. The solution of the resin in styrene may also be hardened at room temperature in usual manner.

It will be understood that the illustrative embodiments of the invention set out herein do not constitute a limitation upon the invention for those skilled in the art can make various modifications in the details of these illustrative embodiments without departing from the spirit and scope of the invention as set out above and defined in the appended claims.

What is claimed is:

1. A process for the production of polyester resins which comprises reacting at a temperature above 180° C. and below the decomposition temperature of at least one of the reactants and in at least one stage a waste product of a shaped high molecular weight polyester of a dihydric alcohol and an acid selected from the group consisting of isophthalic acid and terephthalic acid, having a molecular weight at least as high as is necessary for the preparation of fibres with (a) at least one dicarboxylic acid component being at most olefinically unsaturated and being selected from the group consisting of dicarboxylic acids other than isophthalic and terephthalic acid, anhydrides thereof and esters thereof with a monohydric alcohol having up to 7 carbon atoms and (b) at least one dihydric alcohol, the said acid component other than the isophthalic and terephthalic acid component being applied in an amount of at least 2 moles for every three molecular units of isophthalic and terephthalic ester to yield a polyester resin having a lower molecular weight than the said waste product and at least one of the components (a) and (b) comprising a compound containing a polymerisable olefinic bond and copolymerizing the unsaturated resing formed with an ethylenically unsaturated polymerisable monomer in the presence of a polymerisation catalyst.

2. A process as claimed in claim 1, wherein the reaction is effected by dissolving tthe high molecular weight polyester at a temperature above 180° C. in one reactant and then adding the other reactant.

3. A process as claimed in claim 1, wherein substantially equivalent amounts of the dicarboxylic acid component and the alcohol are employed.

4. A process as claimed in claim 1, wherein the reaction is terminated when the polyester resin has an acid number of not more than 70.

5. A process as claimed in claim 1, wherein the reaction is carried out at a temperature between 200 and 270° C. and wherein the reaction is terminated when the polyester resin has an acid number between 20 and 60.

6. A process as claimed in claim 1, wherein the reaction is carried out in the presence of a solvent.

7. A process as claimed in claim 1, wherein the dihydric alcohol component comprises alcohols selected from the group consisting of alcohols boiling under ordinary pressure above 200° C., partially etherified polyhydric alcohols containing two free hydroxy groups and partially acetalised polyhydric alcohols containing two free hydroxy, groups, in which partially etherified and acetalised polyhydric alcohols the acetal and ether oxygen atoms are bound to an aliphatic carbon atom of a radical containing up to 10 carbon atoms.

8. A process as claimed in claim 1, wherein the dihydric alcohol component contains an at least trihydric alcohol in such an amount that the amount of hydroxy groups contained therein in excess of two is not higher than 10 equivalent percent, calculated on the hydroxyl groups contained in the total amount of the polyhydric component, and wherein a compound selected from the group consisting of monohydric alcohols and monocarboxylic acids is employed in an amount equivalent to the excess hydroxy groups, the total amount of the acid compounds being substantially equivalent to that of the alcoholic compounds.

9. A modification of the process claimed in claim 1, wherein there is also employed a monohydroxy monocarboxylic acid in a molar ratio of monohydroxy monocarboxylic acid to dicarboxylic acid of from 2:1 to 1:5.

10. A process as claimed in claim 1, wherein there is also employed an at least tricarboxylic acid in such an amount that the amount of the carboxylic groups contained therein in excess of two is not higher than 20 equivalent percent, calculated on the carboxylic groups contained in the total amount of the acid component, and wherein there is also employed a compound selected from the group consisting of monocarboxylic acids and monohydric alcohols in an amount equivalent to the excess carboxylic groups, the total amount of the acid compounds being substantially equivalent to that of the alcoholic compounds.

11. A process as claimed in claim 4, wherein the dicarboxylic acid component is at least one $\alpha, \beta$-olefinically unsaturated dicarboxylic acid component selected from the group consisting of dicarboxylic acids, anhydrides thereof and esters thereof with a monohydric alcohol having up to 7 carbon atoms and wherein the ethylenically unsaturated polymerisable monomer has a —CH=CH$_2$- group.

12. A process as claimed in claim 1, wherein at a temperature between 200° C. and 270° C. a waste product of a shaped high molecular weight ethylene glycol terephthalate is reacted with (a) at least one $\alpha,\beta$-olefinically unsaturated dicarboxylic acid component selected from the group consisting of dicarboxylic acids, anhydrides thereof and esters thereof with a monohydric alcohol having up to 7 carbon atoms and (b) at least one dihydric alcohol, the acid in said acid component and the polyhydric alcohol being employed in substantially equivalent amounts, to yield a polyester resin having a lower molecular weight than the said waste product and copolymerising acid unsaturated resin with an ethylenically unsaturated polymerisable monomer having a —CH=CH$_2$- group in the presence of a polymerisation catalyst.

13. A process as claimed in claim 11, wherein the polymerisable monomer contains no conjugated double bond and is liquid under normal conditions, and wherein the monomer is employed in an amount of from 10 to 80% by weight, based on the weight of the unsaturated polyester resin.

14. A process as claimed in claim 12, wherein the polymerisable monomer contains no conjugated double bond and is liquid under normal conditions, and wherein the monomer is employed in an amount of from 30 to 50% by weight, based on the weight of the unsaturated polyester resin.

15. A process as claimed in claim 12 wherein the polymerisation is carried out in the presence of an accelerator.

16. Polyester resins prepared by reacting a waste product of a shaped high molecular weight polyester of a dihydric alcohol and an acid selected from the group consisting of isophthalic acid and terephthalic acid with (a) at least one $\alpha,\beta$-olefinically unsaturated dicarboxylic acid component selected from the group consisting of dicarboxylic acids, anhydrides thereof and esters thereof with a monohydric alcohol having up to 7 carbon atoms and (b) at least one dihydric alcohol whereby an unsaturated polyester resin having a lower molecular weight than the said waste product is obtained and copolymerising the unsaturated polyester thus obtained with an ethylenically unsaturated polymerisable monomer in the presence of a polymerisation catalyst, in which polymerisation product the ethylenically unsaturated monomer having a —CH=CH$_2$-group component is contained in an amount of from 10 to 80% by weight, based on the weight of the unsaturated polyester resin.

17. A solution of a polyester resin obtained by reacting a waste product of a shaped high molecular weight polyester of a dihydric alcohol and an acid selected from the group consisting of isophthalic acid and terephthalic acid with (a) at least one α,β-olefinically unsaturated dicarboxylic acid component selected from the group consisting of dicarboxylic acids, anhydrides thereof and esters thereof with a monohydric alcohol having up to 7 carbon atoms and (b) at least one dihydric alcohol which dissolved polyester resin has a lower molecular weight than the said waste product in an ethylenically unsaturated polymerisable monomer having a —CH=CH$_2$-group containing no conjugated double bond and being liquid under normal conditions.

18. Shaped bodies comprising a resin produced according to the process of claim 1.

References Cited

UNITED STATES PATENTS

| | | | |
|---|---|---|---|
| 3,039,980 | 6/1962 | Mallison | 260—75 |
| 3,042,650 | 7/1962 | Bockstahler | 260—861 |
| 3,117,107 | 1/1964 | Stimpson et al. | 260—75 |
| 3,160,679 | 12/1964 | Lew et al. | 260—75 |
| 3,196,131 | 7/1965 | Mayer et al. | 260—861 |
| 3,257,335 | 6/1966 | Whitfield et al. | 260—75 |

FOREIGN PATENTS

| | | |
|---|---|---|
| 490,032 | 1/1953 | Canada. |
| 801,813 | 9/1958 | Great Britain. |

DONALD E. CZAJA, *Primary Examiner.*

R. W. GRIFFIN, *Assistant Examiner.*

U.S. Cl. X.R.

260—2.3, 33.6, 40, 75, 76, 77, 861 873; 117—126, 132, 134, 148; 161—169.